No. 665,847.  Patented Jan. 8, 1901.
R. M. BARTON.
ANIMAL TRAP.
(Application filed July 23, 1900.)
(No Model.)
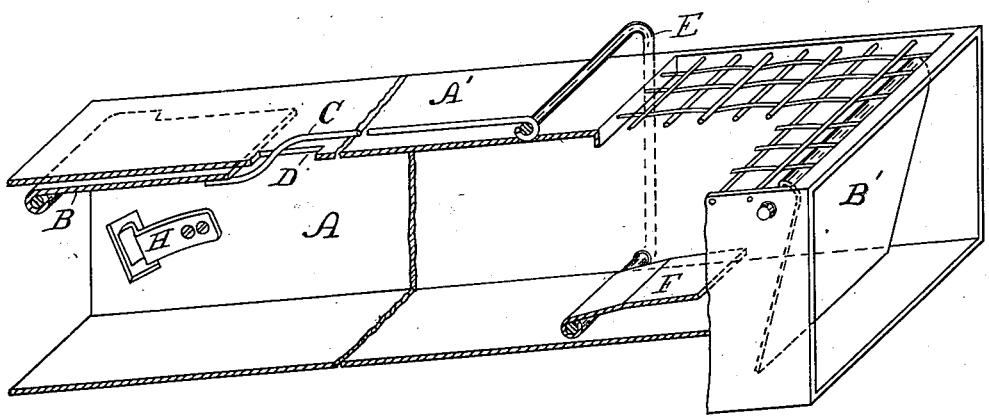
WITNESSES:
Mattie M. Ginnis
C. H. Bennett
INVENTOR,
Royal M. Barton
By Hazard & Harpham
ATTORNEYS.

UNITED STATES PATENT OFFICE.

ROYAL M. BARTON, OF LOS ANGELES, CALIFORNIA, ASSIGNOR TO L. L. HOFF, OF SAME PLACE.

ANIMAL-TRAP.

SPECIFICATION forming part of Letters Patent No. 665,847, dated January 8, 1901.

Application filed July 23, 1900. Serial No. 24,599. (No model.)

*To all whom it may concern:*

Be it known that I, ROYAL M. BARTON, a citizen of the United States, residing at Los Angeles, county of Los Angeles, and State of California, have invented new and useful Improvements in Animal-Traps, of which the following is a specification.

My invention relates principally to traps designed for catching rats and mice; but by making it of proper materials and proportions it may be used for catching other animals; and the object thereof is to provide a trap of simple and inexpensive construction that will be effective in operation. I accomplish this object by the trap described herein and illustrated in the accompanying drawing, forming a part hereof, which is a perspective view of my improved trap, partly in central section and partly in elevation.

For catching mice and rats my trap is in shape preferably quadrilateral, and the case A is preferably made from tin or light galvanized iron, the bottom and sides being preferably imperforate, while the top A', near the end farthest from the entrance, is formed of wire mesh to permit of abundant illumination of the interior of the trap. If desired, holes might be punched in the material forming the top. To the ends of the case are pivoted doors B, which may be pushed inward, but not outward, the door B' fitting very close to the sides and being only intended for use in case it is desired to remove an entrapped animal from that end, while the door B moves freely and when the trap is set is held in open position, as shown in the drawing, by detent-rod C, which passes through slot D in the top and is affixed to lever E, which passes across the top, down each side, and enters the inside of the case, with a pivotal connection near the bottom, and has affixed thereto plate F, adapted to operate the lever when stepped upon by a mouse or rat.

In the operation of my trap the door B is held in an open position, as shown, and suitable bait is placed on the bottom of the trap or hung to the end opposite door B to attract the mouse or rat, which in its attempt to get at the bait steps on the plate F, which depresses it and causes lever E to withdraw the end of detent-rod C from under the end of door B, which then falls from its own weight and is caught and securely held by spring H, affixed to the side of the case, thereby entrapping and holding the animal, which can be easily removed alive, if desired.

Having described my invention, what I claim as new, and desire to secure by Letters Patent, is—

1. An animal-trap comprising a quadrilateral-shaped case, having a partly-perforated top, and pivoted end doors adapted to open inwardly toward the top; a detent-rod passing through a slot in the top of the case, affixed to a lever, the free end of said rod being adapted to support the free end of the door in an elevated open position; a lever, partly within and partly without the case and, having a pivotal movement in the sides thereof near the bottom; a plate affixed to said lever within the case; and a spring on the side of the case, adapted to hold the door closed on the fall thereof.

2. The herein-described animal-trap, comprising casing A, having perforate top A' with slot D therein; pivoted doors B, B' forming the ends of said case; detent-rod C, affixed to lever E and adapted to pass through slot D and support door B in its open elevated position; lever E passing over the top of the case, and down the sides thereof and entering the inside of the case through the sides with a pivotal contact; plate F affixed to lever E within the case and spring H, substantially as described herein.

In witness that I claim the foregoing I have hereunto subscribed my name, this 3d day of July, 1900, at Los Angeles, California.

ROYAL M. BARTON.

Witnesses:
G. E. HARPHAM,
MATTIE MCGINNIS.